(12) United States Patent
Scott et al.

(10) Patent No.: US 6,263,090 B1
(45) Date of Patent: Jul. 17, 2001

(54) CODE READER FINGERPRINT SCANNER

(75) Inventors: Walter Guy Scott, North Palm Beach; James E. Davis, Palm Beach Gardens, both of FL (US)

(73) Assignee: Cross Match Technologies, Inc., Palm Beach Gardens, FL (US)

( * ) Notice: Subject to any disclaimer, the term of this patent is extended or adjusted under 35 U.S.C. 154(b) by 0 days.

(21) Appl. No.: 09/080,911

(22) Filed: May 18, 1998

Related U.S. Application Data

(60) Provisional application No. 60/047,039, filed on May 19, 1997.

(51) Int. Cl.$^7$ .................................................. G06K 9/00
(52) U.S. Cl. .......................................... 382/124; 382/127
(58) Field of Search ................... 356/74, 71; 283/68–69; 382/116, 124–127, 115; 235/380, 382; 340/825.34

(56) References Cited

U.S. PATENT DOCUMENTS

| D. 348,445 | 7/1994 | Fishbine et al. | D14/107 |
|---|---|---|---|
| D. 351,144 | 10/1994 | Fishbine et al. | D14/107 |
| 2,500,017 | 3/1950 | Altman | 88/57 |

(List continued on next page.)

FOREIGN PATENT DOCUMENTS

| 0 101 772 A1 | 3/1984 | (EP) | G07C/9/00 |
|---|---|---|---|
| 0 308 162 A2 | 3/1989 | (EP) | A61B/5/10 |
| 0 379 333 A1 | 7/1990 | (EP) | G07F/7/10 |
| 0 379 333 B1 | 7/1995 | (EP) | G07F/7/10 |
| 0 905 646 A1 | 3/1999 | (EP) | G06K/11/18 |
| 2 089 545 | 6/1982 | (GB) | G06K/9/20 |
| WO 87/02491 | 4/1987 | (WO) | G07C/9/00 |
| WO 90/03620 | 4/1990 | (WO) | G06K/9/20 |
| WO 92/11608 | 7/1992 | (WO) | G06K/9/00 |
| WO 94/22371 | 10/1994 | (WO) | A61B/5/117 |
| WO 96/17480 | 6/1996 | (WO) | H04N/13/93 |
| WO 97/29477 | 8/1997 | (WO) | G09G/5/08 |
| WO 98/12670 | 3/1998 | (WO) | G07C/9/00 |
| WO 99/12123 | 3/1999 | (WO) | G06K/9/00 |

OTHER PUBLICATIONS

Btt (Biometric Technology Today), Finger technologies contacts, 2 pages.
Drake, M.D. et al., "Waveguide hologram fingerprint entry device," *Optical Engineering,* vol. 35, No. 9, Sep. 1996, pp. 2499–2505.
Ultra–Scan Corporation Home Page (visited May 20, 1999) <http://www.ultra–scan.com/index.htm>, 3 pages. (discusses technology as early as 1996).
Profile (last updated Aug. 16, 1998) <http://www.dermalog.de/Britain/Profile/profile.htm>, 3 pages. (discusses technology as early as 1990).
ID–Card System Technical Specifications (last updated Jul. 18, 1998) <http://www.dermalog.de/Britain/Products/ID–Card/idcard2.htm>, 2 pages.
Fujitsu Limited Products and Services (updated Apr. 21, 1999) <http://www.fujitsu.co.jp/hypertext/Products/index–e.html>, 3 pages, Copyright 1995–1999.
Verid Fingerprint Verification (visited May 17, 1999) <http://www.tssi.co.uk/products/finger.html>, 2 pages.
Startek's Fingerprint Verification Products: Fingerguard FG–40 (visited May 18, 1999) <http://www.startek.com.tw/product/fg40/fg40.html>, 3 pages.

(List continued on next page.)

*Primary Examiner*—Bhavesh Mehta
(74) *Attorney, Agent, or Firm*—Sterne, Kessler, Goldstein Fox, P.L.L.C.

(57) ABSTRACT

A code reader incorporated into a fingerprint scanner for viewing of security items such as credit cards, bank cards, passports and the like and comparing embedded coding on the item to an individual's fingerprint. In this manner, the imaging plane can be used to view the security items in combination with scanning the fingerprint of the individual for comparison.

20 Claims, 2 Drawing Sheets

U.S. PATENT DOCUMENTS

| | | | | |
|---|---|---|---|---|
| 3,200,701 | | 8/1965 | White | 88/14 |
| 3,482,498 | | 12/1969 | Becker | 95/12 |
| 3,527,535 | | 9/1970 | Monroe | 356/71 |
| 3,617,120 | * | 11/1971 | Roka | 353/28 |
| 3,947,128 | | 3/1976 | Weinberger et al. | 356/71 |
| 3,968,476 | | 7/1976 | McMahon | 340/146.3 E |
| 4,063,226 | | 12/1977 | Kozma et al. | 365/125 |
| 4,210,899 | | 7/1980 | Swonger et al. | 340/146.3 E |
| 4,414,684 | | 11/1983 | Blonder | 382/4 |
| 4,537,484 | | 8/1985 | Fowler et al. | 354/62 |
| 4,544,267 | | 10/1985 | Schiller | 356/71 |
| 4,681,435 | | 7/1987 | Kubota et al. | 356/71 |
| 4,783,823 | * | 11/1988 | Tasaki et al. | 235/380 |
| 4,792,226 | | 12/1988 | Fishbine et al. | 356/71 |
| 4,811,414 | | 3/1989 | Fishbine et al. | 382/52 |
| 4,876,726 | | 10/1989 | Capello et al. | 382/4 |
| 4,924,085 | | 5/1990 | Kato et al. | 250/227.28 |
| 4,933,976 | | 6/1990 | Fishbine et al. | 382/4 |
| 4,995,086 | | 2/1991 | Lilley et al. | 382/4 |
| 5,054,090 | * | 10/1991 | Knight et al. | 382/127 |
| 5,067,162 | | 11/1991 | Driscoll, Jr. et al. | 382/5 |
| 5,067,749 | | 11/1991 | Land | 283/117 |
| 5,131,038 | | 7/1992 | Puhl et al. | 380/23 |
| 5,146,102 | | 9/1992 | Higuchi et al. | 250/556 |
| 5,187,747 | | 2/1993 | Capello et al. | 382/4 |
| 5,222,152 | | 6/1993 | Fishbine et al. | 382/2 |
| 5,230,025 | | 7/1993 | Fishbine et al. | 382/4 |
| 5,233,404 | | 8/1993 | Lougheed et al. | 356/71 |
| 5,249,370 | | 10/1993 | Stanger et al. | 34/22 |
| 5,384,621 | | 1/1995 | Hatch et al. | 355/204 |
| 5,416,573 | | 5/1995 | Sartor, Jr. | 356/71 |
| 5,467,403 | | 11/1995 | Fishbine et al. | 382/116 |
| 5,469,506 | * | 11/1995 | Berson et al. | 382/115 |
| 5,473,144 | * | 12/1995 | Mathurin, Jr. | 235/380 |
| 5,509,083 | * | 4/1996 | Abtahi et al. | 382/124 |
| 5,517,528 | | 5/1996 | Johnson | 375/259 |
| 5,528,355 | | 6/1996 | Maase et al. | 356/71 |
| 5,548,394 | | 8/1996 | Giles et al. | 356/71 |
| 5,591,949 | | 1/1997 | Bernstein | 235/380 |
| 5,596,454 | | 1/1997 | Hebert | 359/726 |
| 5,598,474 | * | 1/1997 | Johnson | 235/380 |
| 5,613,014 | | 3/1997 | Eshera et al. | 382/124 |
| 5,615,277 | | 3/1997 | Hoffman | 382/115 |
| 5,625,448 | | 4/1997 | Ranalli et al. | 356/71 |
| 5,640,422 | | 6/1997 | Johnson | 375/259 |
| 5,650,842 | | 7/1997 | Maase et al. | 356/71 |
| 5,661,451 | | 8/1997 | Pollag | 340/426 |
| 5,680,205 | | 10/1997 | Borza | 356/71 |
| 5,689,529 | | 11/1997 | Johnson | 375/259 |
| 5,717,777 | | 2/1998 | Wong et al. | 382/124 |
| 5,748,766 | | 5/1998 | Maase et al. | 382/124 |
| 5,755,748 | | 5/1998 | Borza | 607/61 |
| 5,778,089 | | 7/1998 | Borza | 382/124 |
| 5,781,647 | | 7/1998 | Fishbine et al. | 382/1 |
| 5,812,067 | | 9/1998 | Bergholz et al. | 340/825.31 |
| 5,815,252 | * | 9/1998 | Price-Francis | 382/115 |
| 5,822,445 | | 10/1998 | Wong | 382/127 |
| 5,825,005 | * | 10/1998 | Behnke | 382/124 |
| 5,825,474 | | 10/1998 | Maase | 356/71 |
| 5,848,231 | | 12/1998 | Teitelbaum et al. | 395/186 |
| 5,859,420 | | 1/1999 | Borza | 250/208.1 |
| 5,862,247 | * | 1/1999 | Fisun et al. | 382/116 |
| 5,867,802 | | 2/1999 | Borza | 701/35 |
| 5,872,834 | | 2/1999 | Teitelbaum | 379/93.03 |
| 5,900,993 | | 5/1999 | Betensky | 359/710 |
| 5,907,627 | | 5/1999 | Borza | 382/124 |
| 5,920,640 | * | 7/1999 | Salatino et al. | 235/380 |
| 5,974,162 | | 10/1999 | Metz et al. | 382/124 |
| 5,987,155 | * | 11/1999 | Dunn et al. | 235/382 |
| 6,104,809 | * | 8/2000 | Berson et al. | 235/380 |

OTHER PUBLICATIONS

Mytec Technologies Gateway, (visited Apr. 27, 1999) <http://www.mytec.com/Products/gateway/>, 1 page.

Mytec Technologies Gateway: Features & Benefits, (visited Apr. 27, 1999) <http://www.mytec.com/Products/gateway/features.htm>, 1 page.

Mytec Technologies Touchstone Pro, (visited Apr. 27, 1999) <http://www.mytec.com/Products/Touchstone/>, 1 page.

Mytec Technologies Touchstone Pro: Features, (visited Apr. 27, 1999) <http://www.mytec.com/Products/Touchstone/features.htm>, 1 page.

Electronic Timeclock Systems and Biometric Readers (last updated Apr. 17, 1999) <http://www.lfs–hr–bene.com/tclocks.html>, 1 page.

Fingerprint Time Clock (visited May 17, 1999) <http://www.lfs–hr–bene.com/Biometrics/Fingerprintclock.html>, 6 pages.

FC–901: The KSI fingerprint sensor (visited May 17, 1999) <http://www.kinetic.bc.ca/kc–901.html>, 3 pages.

IntelNet Inc. (visited May 20, 1999) <http://www.intelgate.com/index.html>, 1 page, Copyright 1996.

Ver–i–Fus Fingerprint Access Control Systems (visited May 20, 1999) <http://www.intelgate.com/verifus.htm>, 2 pages. (Ver–i–fus product released in 1995).

Ver–i–fus® Configurations (visited May 20, 1999) <http://www.intelgate.com/verconfig.htm>, 1 page. (Ver–i–fus product released in 1995).

Ver–i–Fus® & Ver–i–Fus$^{mil®}$ (visited May 20, 1999) <http://www.intelgate.com/vif_data.htm>, 3 pages. (Ver–i–fus product released in 1995).

Access Control System Configurations (visited May 20, 1999) <http://www.intelgate.com/access.htm>, 2 pages. (Ver–i–fus product released in 1995).

Company (visited May 17, 1999) <http://www.instainfo.com/company.htm>, 2 pages.

Touchlock™ II Fingerprint Indentity Verification Terminal (visited May 17, 1999) <http://www.indentix.com/TLock.htm>, 4 pages.

Physical Security and Staff Tracking Solutions (visited May 17, 1999) <http://www.indentix.com/products/biosecurity.html>, 3 pages. Copyright 1996–1998.

Veriprint2000 Fingerprint Verification Terminal For Use With Jantek Time & Attendance Software (visited May 17, 1999) <http://www.hunterequipment.com/fingerprint.htm>, 2 pages.

Veriprint 2100 Stand–Alone Fingerprint Verification Terminal (visited Apr. 27, 1999) <http://www.biometricid.com/veriprint2100.htm>, 3 pages.

The Dermalog Check—ID (visited Nov. 12, 1999) <http://www.dermalog.de/ganzneu/products_check.html>, 1 page.

Startek's Fingerprint Verification Products: Fingerfile 1050 (visited Oct. 8, 1999) <http://www.startek.com.tw/product/ff1050/ff1050.html>, 3 pages.

Time is Money! (visited Jun. 5, 1998) <http://www.iaus.com/afim.htm>, 3 pages.

Remote Access Positive IDentification—raPID (visited Jun. 3, 1998) http://www.nec.com . . . >, 2 pages, Copyright 1997.

A.F.I.S. (last updated Apr. 2, 1998) <http://www.dermalog.de/afis.htm>, 2 pages.

True–ID™ The LiveScan with special "ability". . . , 2 pages.

Printrak International: User List (visited Jun. 3, 1998) <http://www.printrakinternational.com and links>, 10 pages, Copyright 1996.

Live–Scan Products: Tenprinter® 1133S (visited Apr. 23, 1999) <http://www.digitalbiometrics.com/Products/tenprinter.htm>, 4 pages. (Tenprinter 1133S released in 1996).

TouchPrint™ 600 Live–Scan System (visited Apr. 23, 1999) <http://www.indentix.com/products/livescan.htm>, 4 pages, Copyright 1996–1998.

Verid Fingerprint Reader, TSSI, 4 pages.

Startek's Fingerprint Verification Products, (visited Nov. 17, 1999) <http://www.startek.com.tw/product/index.html>, 1 page.

Introduction to Startek's Fingerprint Verification Products (visited Nov. 17, 1999) <http://www.startek.com.tw/product/index2.html>, 2 pages.

Automatic Fingerprint Identification Systems (visited Nov. 17, 1999) <http://www.sagem.com/en/produit4–en/empreinte–dig–en,htm>, 1 page.

Digital Biometrics Corporate Information (visited Nov. 17, 1999) <http://www.digitalbiometrics.com/Corporate_info/Corporate_info.htm>, 2 pages. (discusses technology as early as 1985).

DBI Live–Scan Products: Digital Biometrics Tenprinter (visited Nov. 17, 1999) <http://www.digitalbiometrics.com/products/tenprinter.htm>, 4 pages. (Tenprinter released in 1996).

DBI Live–Scan Products: Networking Options (visited Nov. 17, 1999) <http://www.digitalbiometrics.com/products/networking_options.htm>, 3 pages.

DBI Live–Scan Products: Image Printer Stations (visited Nov. 17, 1999) <http://www.digitalbiometrics.com/products/imageprinter.htm>, 2 pages.

DBI Live–Scan Products: FC–21 Fingerprint Capture Station (visited Nov. 17, 1999) <http://www.digitalbiometrics.com/products/Fingerprintcapture.htm>, 2 pages.

Series 400 OEM Scanner (visited Nov. 17, 1999) <http://www.ultra–scan.com/400.htm>, 3 pages. (Scanner released in 1996).

USC Scanner Design (visited Nov. 17, 1999) <http://www.ultra–scan.com/scanner.htm>, 4 pages. (Scanner released in 1996).

Series 500/600 Scanners (visited Nov. 17, 1999) <http://www.ultra–scan.com/500.htm>, 3 pages. (Scanner released in 1996).

Indentix: The Corporation (visited Nov. 17, 1999) <http://www.indentix.com/corporate/home.htm>, 2 pages, Copyright 1996–1998.

Biometric Imaging Products (visited Nov. 17, 1999) <http://www.indentix.com/products/bioimage.htm>, 1 page, Copyright 1996–1998.

TouchPrint® 600 Live–Scan System (visited Nov. 17, 1999) <http://www.indentix.com/products/livescan.htm>, 4 pages, Copyright 1996–1998.

TouchPrint® Palm Scanner (visited Nov. 17, 1999) <http://www.indentix.com/products/palmscan.htm>, 3 pages, Copyright 1996–1998.

TouchPrint® Card Scan System (visited Nov. 17, 1999) <http://www.indentix.com/products/cardscan.htm>, 3 pages, Copyright 1996–1998.

Dermalog Key—The safest and easiest way of access control (Last updated Jul. 18, 1998) <http://www.dermalog.de/Britain/Products/Key/key.htm>, 1 page.

Dermalog Finger–ID Your small size solution for high security (Last updated Jul. 18, 1998) <http://www.dermalog.de/Britain/Products/Finger/fingerid.htm>, 1 page.

Mytec: Corporate (visited Nov. 17, 1999) <http://www.mytec.com/corporate/>, 2 pages.

Kinetic Sciences Inc. Fingerprint Biometrics Division (visited Nov. 17, 1999) <http://www.kinetic.bc.ca/main–FP–B.html>, 1 page.

POLLEX Technology Ltd., The Expert in Fingerprint Identification—POLLog (visited Nov. 17, 1999) <http://www.pollex.ch/english/products/pollog.htm>, 2 pages.

Sony Fingerprint Identification Terminal (visited Nov. 17, 1999) <http://www.iosoftware.com/biosols/sony/fiu/applications/fit100.htm>, 2 pages.

Sony Fingerprint Identification Unit (visited Nov. 17, 1999) <http://www.iosoftware.com/biosols/sony/fiu/index.htm>, 3 pages.

Fujitsu Fingerprinting Recognition Device (FPI–550) (visited Nov. 17, 1999) <http://www.iosoftware.com/biosols/fujitsu/fpi550.htm>, 2 pages.

Mitsubishi MyPass LP–1002 (visited Nov. 17, 1999) <http://www.iosoftware.com/biosols/mitsubishi/mypass.htm>, 2 pages.

SecureTouch PV—A Personal Password Vault (visited Nov. 17, 1999) <http://www.biometricaccess.com/securetouch_pv.htm>, 1 page.

Digital Descriptor Systems, Inc.—Profile (visited Nov. 17, 1999) <http://www.ddsi–cpc.com/pages/profile.html>, 3 pages.

Press Release: Printrak International Announces New Portable Fingerprint ID Solution, Dec. 10, 1996, (visited Nov. 17, 1999) <http://www.scott.net/~dg/25.htm>, 3 pages.

Corporate Profile (visited Nov. 17, 1999) <http://www.printrakinternational.com/corporate.htm>, 1 page.

Printrak Products (visited Nov. 17, 1999) <http://www.printrakinternational.com/Products.htm>, 1 page. (Discusses technology as early as 1974).

Verifier™ Fingerprint Capture Devices, Cross Match Technologies, Inc., 2 pages, 1996–1997.

Verifier 200 Direct Fingerprint Reader, Cross Check Corporation, 2 pages, 1996–1997.

Verifier™ 250 Fingerprint Capture Devices, Cross Match Technologies, Inc., 2 pages, 1996–1997.

Verifier 250 Small Footprint Direct Fingerprint Reader, Cross Check Corporation, 2 pages, 1996–1997.

Verifier™ 290 Fingerprint Capture Devices, Cross Match Technologies, Inc., 2 pages, 1996–1997.

Verifier 290 Direct Rolled Fingerprint Reader, Cross Check Corporation, 2 pages, 1996–1997.

Biometric terminal, 1 page.

Cross Match Technologies, Inc. (visited Mar. 25, 1999) <http://www.crossmatch.net/>, 1 page.

Cross Match Technologies, Inc.—Products Overview (visited Mar. 25, 1999) <http://www.crossmatch.net/new/products/product–index.html>, 1 page.

Cross Match Technologies, Inc.—Law Enforcement Systems (visited Mar. 25, 1999) <http://www.crossmatch.net/new/law/law–index.html>, 2 pages.

Cross Match Technologies, Inc.—Commercial Systems: Building On The Standard (visited Mar. 25, 1999) <http://www.crossmatch.net/new/commercial/commercial–index.html>, 2 pages.

Cross Match Technologies, Inc.—International Sales (visited Mar. 25, 1999) <http://www.crossmatch.net/new/sales/sales–index.html>, 1 page.

Cross Match Technologies, Inc.—Support (visited Mar. 25, 1999) <http://www.crossmatch.net/new/support/support–index.html>, 1 page.

Cross Match Technologies, Inc.—News—Press Releases—Verifier 400 Press Release (visited Mar. 25, 1999) <http://www.crossmatch.net/new/news/news–pr–050798.html>, 1 page.

* cited by examiner

CODE READER FINGERPRINT SCANNER

BACKAROUND OF THE INVENTION

This application claims a priority date of May 19, 1997 based upon provisional patent application Ser. No. 60/047,039.

FIELD OF THE INVENTION

The instant invention is directed to the field of security control and, in particular, to a code reader incorporated in a fingerprint scanner.

The unauthorized use of documents such as passports, credit cards, tickets, checks and so forth is a continuing problem. Various types of background patterns imposed upon the documents, usually by a process such as offset printing or lithography, has helped to reduce duplication of such documents but does not prevent the unauthorized use.

What is lacking in the art is a means for determining that the holder of a security item is the authorized user of the item.

SUMMARY OF THE INVENTION

The instant invention is a code reader incorporated into a fingerprint scanner. An imaging plane is set up to view security items such as credit cards, bank cards, passports and the like. The objects intended for viewing would usually, but not necessarily, have codes printed on them for machine reading. The codes may be UPC, OCR-B, PDF417, DataGlyph codes or the like. Each security item would hold fingerprint identification data. In this manner, the imaging plane can be used to view the security items in combination with scanning the fingerprint of the individual for comparison.

In operation, the fingerprint scanner captures the image of a fingerprint via a CCD camera to a framegrabber in a computer for analysis. The code reader interprets the coding placed upon the security item and compares it against the coded fingerprint image. If the images match, the use of the item is authorized.

An object of the instant invention is to provide a positive identification of an individual at any location with a printed, encoded, encrypted, redundant data base on an optically viewable substrate.

Yet another object of the instant invention is to provide a single housing for comparing an individual's fingerprint to a security device having personal indicia of the individual placed thereon.

Other objects and advantages of this invention will become apparent from the following description taken in conjunction with the accompanying drawings by way of illustration and example, certain embodiments of this invention are set forth. The drawings constitute a part of this specification and include an exemplary embodiment of the present invention.

DETAILED DESCRIPTION OF THE PREFERRED EMBODIMENT

Figure 1:
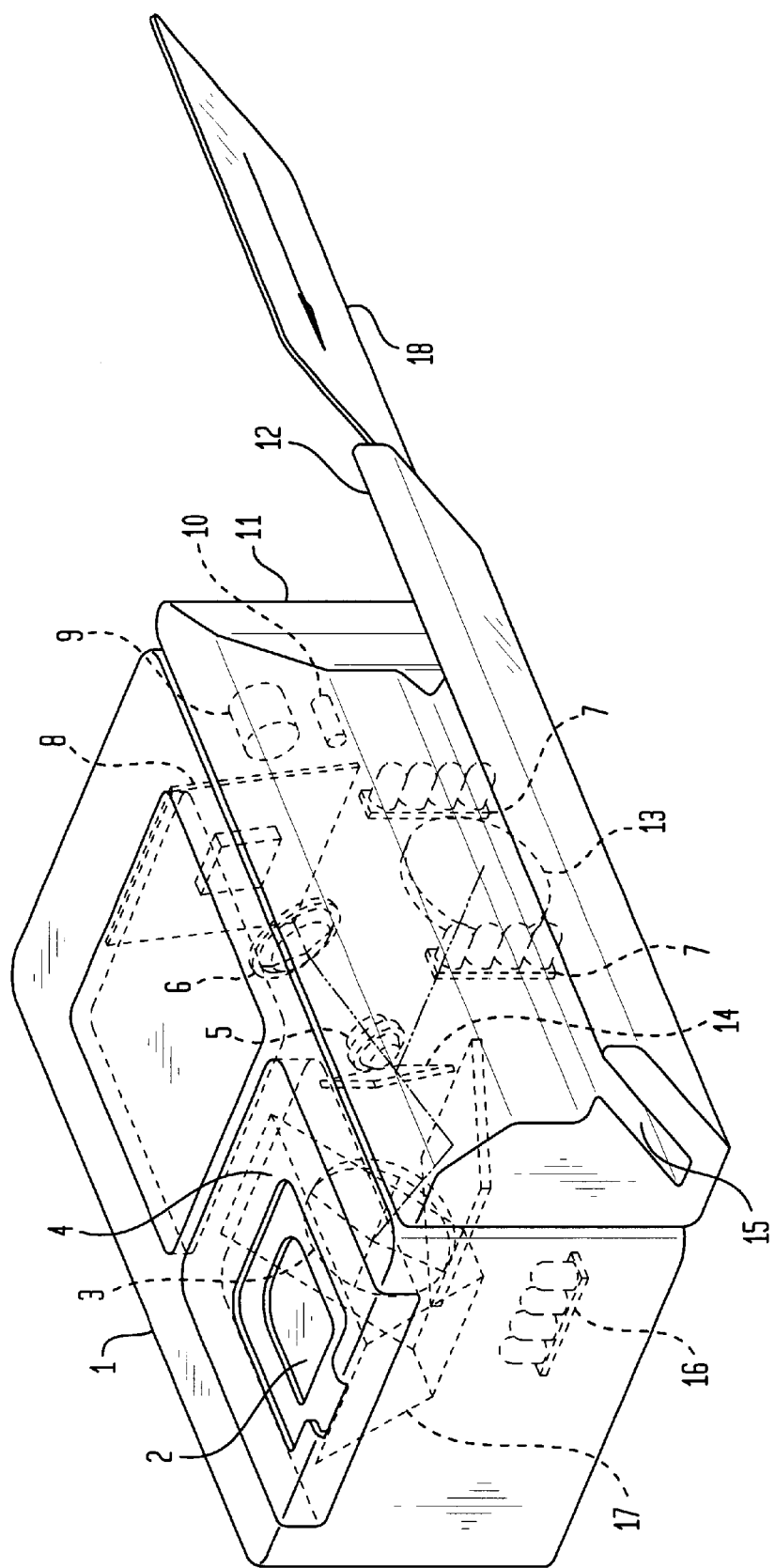
FIG. 1 is a perspective view of the code reader with fingerprint scanner.

Referring to the Figures in general, FIG. 1 depicts the code reader with fingerprint scanner of the instant invention having a housing 1 with an upper surface having a fingerprint scanner plate 2. The finger is placed on the scanner plate 2 and illuminated by an LED 16 light source of certain spectral characteristics. The image of the fingerprint is captured by a CCD camera 8 through a prism 17 having multiple lens elements 3, 5, and 6. The image is inputted into the camera to a frame grabber in a computer for analysis.

The illumination of the fingerprint area is then turned off and the illumination of the optical reader area is illuminated with a different spectral characteristic by card illuminators 7. A dichroic mirror 14 then conducts the image area to the CCD camera where the same chain of optics and electronics can be used to acquire and process the images. A card 18 having an identification code is placed along card support 12 for reading by a card reader lens 13. The image area consists of a slot where an object of size greater than the viewing area of the CCD can be passed through. The images will be acquired and summed together in a way to provide an image of a large area.

The fingerprint scanner captures and codes the fingerprint image while the code reader reads the UPC, OCR-B, PDF417, DataGlyph codes placed on the card 18 placed before card reader lens element 13.

Figure 2:
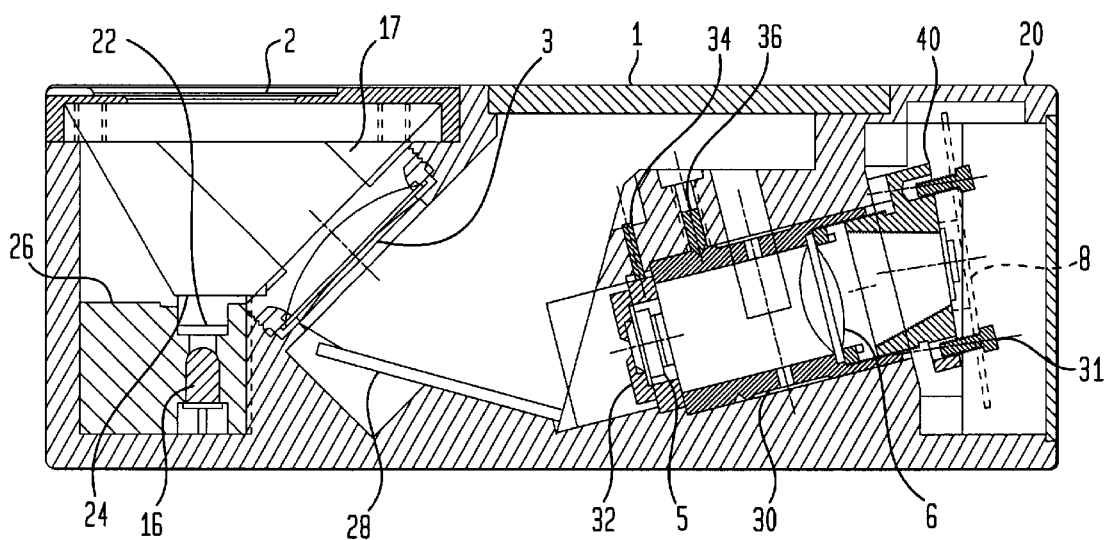
FIG. 2 is a cross sectional side view of the fingerprint scanner.

FIG. 2 depicts the fingerprint scanner portion of the instant invention having a housing 1 with an upper surface 20 having the fingerprint scanner plate 2. The finger is placed on the scanner plate 2 and illuminated by an LED 16 light source of certain spectral characteristics through lens 22 into the bottom 26 of prism 17. The LED 16 held in a housing 24. The image of the fingerprint is captured by a CCD camera 8 having lens element 3 reflected from mirror surface 28 to lens 5 into camera focal lens 6. The image is inputted into the camera 8 to a frame grabber and to a computer, not shown, via video output 9 shown in FIG. 1 for analysis.

The camera 8 is secured to the lens holder 30 by mounting bolts 31. Adjustments to the lens are made with lens housing adjustment screws 32, 34, and 36. The camera 8 has a focal housing 40 which threadingly engages the lens housing 30.

In an embodiment according to the present invention, an identity verification device comprises a fingerprint scanner assembly, a code reader assembly, and a computer means.

The fingerprint scanner assembly includes a housing with a transparent scanner plate sized for placement of an individual's finger on an upper surface; a first light source means for illumination of the finger; and a CCD camera optically associated with the scanner plate, wherein the CCD camera is adapted to convert an image of a fingerprint of the finger into a first output signal.

The code reader assembly includes a card support; a second light source means for illumination of a card placed adjacent the card support, wherein the CCD camera is optically associated with the card support, and wherein the CCD camera is adapted to convert an image of the card into a second output signal.

The computer means is operatively associated with the assembly, and is directed by software to compare the first output signal with a first control image and the second output signal with a second control image. The software further directs the computer to produce diagnostic output. Further, a means for transmitting the diagnostic output to an operator of the verification device is included.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. A method for identity verification, comprising the steps of:
    capturing at least one fingerprint image and generating information representative thereof, wherein said capturing step comprises the steps of:
        illuminating a scanner plate with light of a second spectral characteristic to create a fingerprint image, and
        detecting the fingerprint image;
    reading fingerprint coding placed upon a security item and generating information representative thereof, wherein said reading step comprises the steps of:
        receiving the security item in an image area.
        illuminating the image area with light of a first spectral characteristic, and
        detecting the image area; and
    comparing the information representative of the fingerprint coding and information representative of the captured at least one fingerprint image; whereby an identity verification can be made.

2. The method of claim 1, wherein said comparing step comprises the step of comparing information representative of said detected image area and information representative of said detected fingerprint image.

3. The method of claim 1, further comprising the step of switching between said detecting the image area step and said detecting the fingerprint image step.

4. The method of claim 1, wherein said fingerprint image detecting step comprises the step of:
    conducting light reflected from the scanner plate along a first path to a camera; wherein said image area detecting step comprises the steps of:
    conducting light reflected from the image area along a second path that is perpendicular to the first path; and
    redirecting the light conducted along the second path to travel along the first path to the camera.

5. The method of claim 1, wherein said reading step comprises:
    reading fingerprint coding placed upon the security item, said fingerprint coding comprising at least one of UPC, OCR-B, PDF417, and DataGlyph formats.

6. The method of claim 1, wherein said reading step comprises:
    reading fingerprint coding placed upon the security item, said fingerprint coding comprising a PDF format.

7. The method of claim 1, wherein said reading step comprises the step of reading fingerprint coding placed upon a security item, wherein the security item is at least one of a credit card, a bank card, and a passport.

8. An apparatus for verifying identity, said apparatus comprising:
    a fingerprint scanner;
    a code reader, wherein said code reader reads an identification code from a security item, wherein said code reader illuminates said security item with light of a second spectral characteristic; and
    a computer that compares information representative of a fingerprint image scanned by said fingerprint scanner to information representative of an identification code read by said code reader, whereby an identity can be verified when the comparison indicates a match occurs;
    wherein said fingerprint scanner comprises:
        a camera,
        a transparent fingerprint scanner plate that a finger may be placed against,
        a fingerprint scanner light source that illuminates said finger with light of a first spectral characteristic through said fingerprint scanner plate producing a reflected fingerprint image,
        a prism that filters said reflected fingerprint image,
        a fingerprint scanner lens element that focuses said reflected fingerprint image,
        a dichroic mirror that substantially directs said reflected fingerprint image toward said camera, and
        at least one lens element that further focuses said reflected fingerprint image to said camera for detection of said reflected fingerprint image.

9. The apparatus of claim 8, wherein said fingerprint scanner light source comprises at least one LED of said at least a first spectral characteristic.

10. The apparatus of claim 8, wherein said code reader comprises:
    a card support that a security item is placed against;
    at least one card illuminator that illuminates said security item placed in said card support producing a reflected security item image; and
    a card reader lens element that focuses said security item image;
    wherein said dichroic mirror directs said security item image through said at least one lens element to said camera where said security item image is detected.

11. The apparatus of claim 10, wherein said at least one card illuminator illuminates said security item with said light of at least a second spectral characteristic.

12. The apparatus of claim 11, wherein said computer comprises a frame grabber that receives detected images from said camera and generates outputs representing frames corresponding to the detected images.

13. The apparatus of claim 12 wherein said computer comprises:
    a fingerprint image coder that codes at least one fingerprint image output by said frame grabber;
    a security item image reader that reads at least one security item image output by said frame grabber and outputs a security item image code;
    a code comparator that compares the coded fingerprint image to the security item image code, and determines whether a match exists; and
    an output device which indicates whether said match exists.

14. The apparatus of claim 8, wherein said fingerprint scanner, said code reader, and said computer are mounted in a single housing.

15. The apparatus of claim 8, wherein said identification code includes fingerprint coding in at least one of UPC, OCR-B, PDF417, and DataGlyph formats.

16. The apparatus of claim 8, wherein said identification code includes fingerprint coding in a PDF format.

17. The apparatus of claim 8, wherein said security item is at least one of a credit card, a bank card, and a passport.

18. A system for identity verification, comprising:
    means for capturing at least one fingerprint image and generating information representative thereof, wherein said capturing means comprises:
        means for illuminating a scanner plate with light of a second spectral characteristic to create a fingerprint image, and means for detecting the fingerprint image;

means for reading fingerprint coding placed upon a security item and generating information representative thereof, wherein said reading means comprises:
means for receiving the security item in an image area,
means for illuminating the image area with light of a first spectral characteristic, and
means for detecting the image area; and means for comparing the information representative of the fingerprint coding and information representative of the captured at least one fingerprint image; whereby an identity verification can be made.

19. An apparatus for verifying identity, comprising:

a fingerprint scanner having a surface that a finger may be placed against, and a fingerprint scanner light source tat illuminates the surface with light of a first spectral characteristic when a finger is placed on the surface to produce a reflected fingerprint image;

a code reader, wherein said code reader reads an identification code from a security item, wherein said code reader illuminates said security item with light of a second spectral characteristic; and a comparator that compares information representative of the reflected fingerprint image scanned by said fingerprint scanner to information representative of an identification code read by said code reader, whereby an identity can be verified when the comparison indicates a match occurs.

20. The apparatus of claim 19, wherein said fingerprint scanner further comprises:

a dichroic mirror;

a camera; and a prism, wherein said prism outputs the reflected fingerprint image to said dichroic mirror, and said dichroic mirror further directs the reflected fingerprint image to said camera.

* * * * *